(12) United States Patent
Minerva

(10) Patent No.: US 7,719,454 B2
(45) Date of Patent: May 18, 2010

(54) LOGICAL CURRENT DIVISION MULTIPLEXING FOR ENCODING MULTIPLE DIGITAL SIGNALS

(75) Inventor: Chris Minerva, Seattle, WA (US)

(73) Assignee: Embedded Engineering Services, Inc, Seattle, WA (US)

( * ) Notice: Subject to any disclaimer, the term of this patent is extended or adjusted under 35 U.S.C. 154(b) by 0 days.

(21) Appl. No.: 12/043,828

(22) Filed: Mar. 6, 2008

(65) Prior Publication Data

US 2008/0218394 A1 Sep. 11, 2008

Related U.S. Application Data

(60) Provisional application No. 60/905,572, filed on Mar. 6, 2007.

(51) Int. Cl.
*H03M 1/66* (2006.01)

(52) U.S. Cl. .............. 341/144; 341/136; 341/152; 341/153

(58) Field of Classification Search ......... 341/135, 341/136, 144–154, 155
See application file for complete search history.

(56) References Cited

U.S. PATENT DOCUMENTS

| | | | |
|---|---|---|---|
| 4,092,639 A | 5/1978 | Schoeff | |
| 4,179,687 A | 12/1979 | van de Plassche et al. | |
| 4,725,816 A | 2/1988 | Petterson | |
| 5,254,883 A | 10/1993 | Horowitz et al. | |
| 5,913,075 A | 6/1999 | Beers et al. | |
| 6,198,418 B1* | 3/2001 | Ishizuka | 341/144 |
| 6,380,877 B2* | 4/2002 | Castaneda et al. | 341/154 |
| 6,583,744 B2* | 6/2003 | Bright | 341/145 |
| 6,606,042 B2* | 8/2003 | Sonkusale et al. | 341/120 |
| 6,621,259 B2 | 9/2003 | Jones et al. | |
| 6,756,738 B2* | 6/2004 | Maede et al. | 315/169.1 |
| 6,954,166 B2* | 10/2005 | Kasai | 341/144 |
| 6,992,647 B2* | 1/2006 | Hanada et al. | 345/76 |
| 7,012,597 B2* | 3/2006 | Kasai | 345/204 |
| 7,019,676 B2* | 3/2006 | Ikoma et al. | 341/144 |
| 7,173,553 B2* | 2/2007 | Ohmi et al. | 341/145 |
| 7,321,326 B2* | 1/2008 | Imai | 341/144 |
| 7,564,390 B2* | 7/2009 | Frazier et al. | 341/144 |
| 2003/0001765 A1* | 1/2003 | Bright | 341/145 |
| 2006/0022856 A1* | 2/2006 | Choe | 341/144 |
| 2008/0117092 A1* | 5/2008 | Wolf et al. | 341/161 |
| 2008/0291070 A1* | 11/2008 | Ueno et al. | 341/144 |

OTHER PUBLICATIONS

International Search Report and Written Opinion for PCT/US08/56081, mailed on Jul. 23, 2008, 10 pgs.
Nairn, D.G. Salama, C.A.T.; "A Current Mode Algorithmic Analog-To-Digital Convertor", Circuits and Systems, 1988., IEEE International Symposium on Volume, Issue, Jun. 7-9, 1988 p. 2573-2576 vol. 3 Digital Object Identifier 10,1109/ISCAS. 1988.15467.

* cited by examiner

*Primary Examiner*—Linh V Nguyen

(57) ABSTRACT

A method and a system are disclosed for transmitting an N-bit digital signal at a source. The N-bit digital signal representing a binary value is used to modulate an electrical current by using N discrete voltages representing each bit. The N discrete voltages are coupled to N corresponding switches to control the switches. The switches conduct a corresponding electrical current if the value of the corresponding discrete voltage is the binary value of 1. The currents from each of the closed switches are summed to form a current-encoded data signal in a single physical conductor representing the original N-bit digital signal. The current-encoded data signal is transmitted through the single physical conductor to a current decoder for decoding the current-encoded data signal and extracting the original N-bit digital signal at a destination.

37 Claims, 11 Drawing Sheets

LOGICAL CURRENT DIVISION MULTIPLEXING FOR ENCODING MULTIPLE DIGITAL SIGNALS

CROSS-REFERENCE TO RELATED APPLICATION

This application claims the benefit of the U.S. Provisional Application No. 60/905,572, filed Mar. 6, 2007, entitled "LOGICAL CURRENT DIVISION MULTIPLEXING," the disclosure of which is hereby expressly incorporated by reference, and the filing date of which is hereby claimed under 35 U.S.C. §119(e).

BACKGROUND

Ever-increasing performance and functionality of circuits, particularly integrated circuits (IC) generally implemented on a semiconductor substrate, like a silicon chip, is a virtual requirement in modern computing and consumer electronics environments. As ubiquitous devices such as mobile phones, personal digital assistants (PDA), personal computers (PC), personal media players, and the like, take an ever-expanding role in the daily lives of people, the market for these devices demands ever-higher levels of performance and functionality at lower costs. To fulfill this market demand, the designers and manufacturers of IC's, such as microprocessors, microcontrollers, and other digital chips such as DMA (Direct Memory Access), memory controllers, and the like, are faced with the optimization and balance of several different and often conflicting requirements. Among the significant competing requirements for the design and manufacture of IC's are cost, performance, exposure of functionality, reduction in size, reduction in power consumption, and reduction or adequate dissipation of heat.

Performance is often measured in terms of some sort of number of operations per unit time, such as MFLOPS (Millions of Floating point Operations Per Second) for math coprocessors, MIPS (Millions of Instructions Per Second) for general purpose processors, etc. At hardware level, higher performance may be achieved in one or a combination of several techniques. These techniques include using higher clock frequency, and thus higher transistor switching rates, wider communication buses (e.g., data bus, control bus, etc.), and one or more memory caches. Additionally, types of components used may also increase performance. For example, GaAs (Gallium Arsenide) transistors may provide better performance at high frequencies than silicon-based CMOS (Complementary Metal Oxide Semiconductor) transistors. Wider communication buses translate to larger chip areas and thus increased size and power consumption. Addition of cache memory, likewise, increases the size and cost of the IC chips. Higher performance types of components, such as some types of transistors, may also increase cost of manufacturing and/or power consumption and heat.

With added performance and functionality to an IC chip comes the burden of providing a signal interface for using such added performance and functionality. For example, a wider data bus requires a greater number of pins in the IC package to expose the data bus to other hardware, such as external memory, external system bus, and other IC chips on an electronic board. The IC chips are generally contained in plastic or ceramic packages with the signals from the IC bonded to pins on the package. The IC chip itself is hidden from sight and is accessible only through the package. Thus, the size of the package is what ultimately counts in terms of size because it is the package that is used in devices or boards, not the IC itself. As such, even if the IC is miniaturized to a desired level, if many signals need to be exposed, the effective size of the package cannot be reduced beyond what is required to expose all signals. For example, if an IC has 128 signals, then the minimum size of the package must accommodate the exposure of 128 pins bonded to each IC signal, respectively, regardless of the size of the IC itself. Several paradigms have been adopted and/or standardized by most IC manufacturers for reducing or better managing the number of interface signals/pins. Some paradigms expose bidirectional signal interfaces to/from a chip while others expose input- or output-only connectivity. However, the common shortcoming in all of the current state-of-the-art signal interface implementations is that each signal requires its own dedicated physical electrical conductor to transmit information.

Therefore, there is a need to reduce the number of pins on an IC package to reduce the effective size of an IC while improving or at least not worsening other requirements, such as functionality, performance, power consumption, cost, and heat generation.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the present disclosures, a circuit for encoding an N-bit digital signal onto an electrical current is provided. The circuit includes N switching components, such as a transistor, each one including a first switching terminal, a second switching terminal, and a third switching terminal. N current limiting components, such as resistors, are coupled to the first switching terminal of each of the corresponding N switching components. The third switching terminals of all N switching components are connected together and grounded. Each bit of an N-bit digital signal source, such as a digital word, is coupled with the second switching terminal, such as a base of a transistor, of each of the corresponding N switching components. A single line is connected to all N resistors to conduct a current-encoded signal.

According to another aspect of the present disclosures, a circuit for decoding current-encoded signal representing a digital word is disclosed. The circuit includes an input for receiving a current-encoded signal, a number of current-to-digital converter bit stages arranged in a configuration from a least significant bit (LSB) position to a most significant bit (MSB) position, where each bit stage is coupled with a next bit stage. Each bit stage in turn includes a current sense module for sensing a current level of the current-encoded signal, a current sink module for dividing the current-encoded signal into a sinking portion and a residual portion, a current router module for routing the residual portion of the current-encoded signal to the next bit stage, and a binary output representing one bit of the digital word represented by the current-encoded signal.

According to yet another aspect of the present disclosures, a method for encoding an N-bit binary word onto a current is disclosed. The method includes associating a unique current range with each of the $2^N$ (2 to the power of N) unique combinations of the N bits of the N-bit binary word, and using each of the N bits simultaneously to modulate a current. The value of the modulated current is determined based on the unique current ranges associated with a unique combination of the N bits representing a particular value of the N-bit binary word.

According to yet another aspect of the present disclosures, a method for decoding a current-encoded signal representing an N-bit binary word is disclosed. The method includes routing the current-encoded signal to a current comparator in one bit stage of N consecutive bit stages, comparing a value of the current-encoded signal to a current value of the one bit stage, and if the value of the current-encoded signal is greater than the current value of the one bit stage, outputting a binary value of '1'. The outputted binary value of '1' corresponds to the one bit stage. The method further includes reducing the value of the current-encoded signal by an amount equal to the current value of the one bit stage to produce a residual value of the current-encoded signal. The above steps repeat for each of the N bit stages.

According to yet another aspect of the present disclosures, a method for transmitting a digital signal is disclosed. The method includes using an N-bit digital signal representing a binary value to modulate an electrical current, wherein the N-bit digital signal comprises N discrete voltages, each voltage representing a binary value of 0 (zero) or 1 (one). The method further includes using each of the N discrete voltages to close N discrete switches to conduct a corresponding electrical current, if the value of the corresponding discrete voltage is the binary value of 1. The method further includes summing the corresponding electrical currents to form a current-encoded data signal in a single physical conductor, transmitting the current-encoded data signal through the single physical conductor to a current decoder, and decoding the current-encoded data signal to extract the N-bit digital signal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
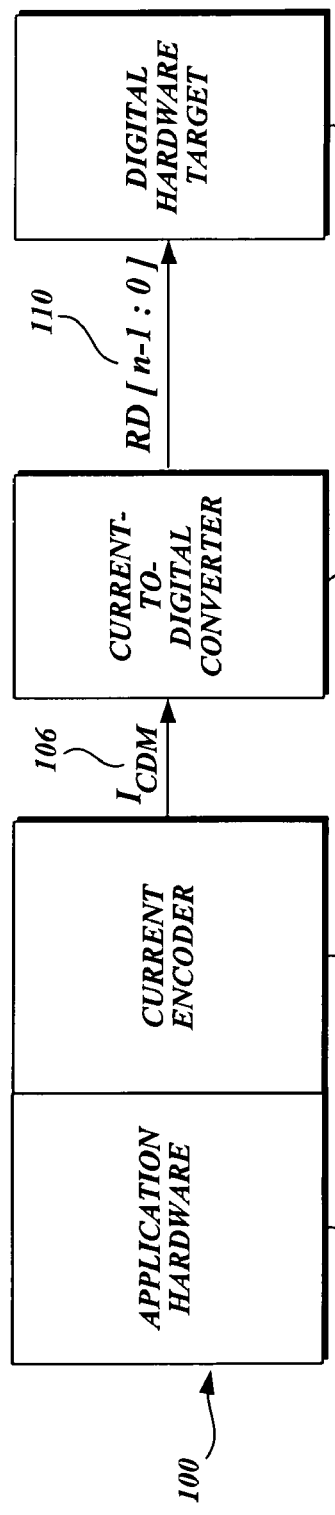
FIG. 1A is a block diagram of an illustrative circuit for converting multiple digital signals to a multiplexed current mode signal using a current-to-digital converter.

A system and a method are described for multiplexing multiple digital signals onto a single physical conductor in current mode. The number of signal pins on an IC package or other circuit interface may be reduced by encoding multiple digital signals from a source end in current mode and transmitting the encoded current via a single physical conductor or pin. The current is encoded by modulating the current using the digital signal. The encoded current may be decoded to recover the original multiple digital signals at a receiving target or destination end. In one illustrative embodiment, the current encoding includes the mapping of different bit patterns/combinations corresponding to the data represented by a combination of the multiple digital signals from the source end to different current values flowing through the single physical conductor. For example, a bit combination of 001 may be mapped to an average current of 10 Micro-amps while a bit combination of 010 may be mapped to an average current of 20 Micro-amps. Thus, all bit-level data patterns represented on N distinct signals may be represented by $2^N$ distinct current levels on a single physical conductor. In one illustrative embodiment, the current encoding is uni-directional, transmitting the encoded current from a source to a destination only. In another illustrative embodiment, the current encoding is bi-directional, providing bi-directional signal transmission.

A number of significant advantages may be realized by the present disclosures. For example, depending upon the application, up to 12 or more signals may be encoded onto a single wire that interfaces to a single pin on the IC package. The reduction of an N-signal interface contribution to package size is proportional to [N−1]/N. For example, encoding an 8-bit digital bus onto a single wire using the present disclosures reduces the size contribution by 87.5%.

Another advantage is with respect to electromagnetic radiation of the circuit. Electromagnetic radiation generation in an electronic circuit is proportional to the rate change of current consumption per unit time in various leads and conductors of the circuit. Multiplexing N signal bits onto a single conductor by current modulation provides an [N−1]/N reduction in electromagnetic radiation attributable to the N signal bits because only one physical signal is changing instead of N outside the chip substrate, for example, on the circuit board. Therefore, a circuit that incorporates a signal interface according to the aspects of the present disclosures generates 1/N the magnitude of emissions than that of the current state-of-the-art voltage switching implementation.

A third advantage of the present disclosures is with respect to power consumption. Current modulation enables the representation of an N-bit digital word at lower power consumption than current state-of-the-art voltage switching implementations. In electronic switching circuits, most commonly implemented using CMOS technology, power consumption is proportional to the number of switches between OFF and ON (or '0' and '1') states per unit time and by the amount of voltage change between the states. Current modulation makes very small changes to the voltage level of the signal to affect logic changes, leading to less power consumption. This is unlike CMOS digital inputs which need stronger transition currents to switch between cutoff and saturation states corresponding to logical '0' and '1' states, respectively. Lower power consumption, in turn, results in lower heat generation, thus, multiplying the advantages of the present disclosures.

Finally, the systems and methods of the present disclosures enable higher performance and data throughput without increasing the switching speed of the bus. For example, a traditional 800 MHz 8-bit digital bus can be replaced by a single-bit current bus running at 100 MHz using current-encoded data transmission and still convey the same quantity of information.

The process of information transmission using current encoding generally includes three stages: a signal transmission stage or source, a signal conversion stage, and a signal receiving stage or target. The signal conversion stage may be implemented in different ways. In one illustrative embodiment, a current decoder method is used, further described in detail with respect to FIGS. 1A and 1B. In another illustrative embodiment, a current sense amplifier method is used, further described below with respect to FIG. 8. FIG. 1A is a high-level illustrative example of a current mode encoding circuit. Typically, the signal transmission stage includes an electronic subsystem 100, such as a circuit board or an IC package. The electronic subsystem 100 may include a traditional multi-signal application hardware 102 and a current encoder 104 used to encode the signals generated by the application hardware 102 to current mode. The application hardware 102 may be any traditional digital circuit such as a controller, USART (Universal Synchronous Asynchronous Receiver Transmitter), memory, buffer, DMA, ASIC (Application Specific IC), etc. The application hardware 102 has a digital interface where data and control buses of various bit-widths, for example, 8-bit, 16-bit, etc., are used to transmit and receive digital information. In one illustrative embodiment, a current encoder circuit 104 is used to encode the digital information generated by or sourced from the application hardware 102 onto an electrical modulated current ICDM 106 by current division multiplexing, as more fully described below with respect to FIG. 1B and 2.

The ICDM 106 is used to transmit the digital information sourced from the application hardware 102 as information encoded by current division multiplexing. In one illustrative embodiment, the current conversion stage includes a current-to-digital converter 108 that converts the encoded information embedded in the ICDM 106 back into a multi-bit digital data word 110 for use by the receiving stage. Conventionally, an N-bit digital data word is represented as bit 0 through bit N−1. The current-to-digital converter 108 may be implemented in several different ways, such as current decoding and current sensing, more fully described below with respect to FIGS. 5, 6, and 8.

At the final stage, other traditional digital hardware target 112, such as a microprocessor, receives and processes conventionally formatted N-bit digital data words extracted from the modulated current ICDM 106 by the current-to-digital converter 108.

Figure 1B:
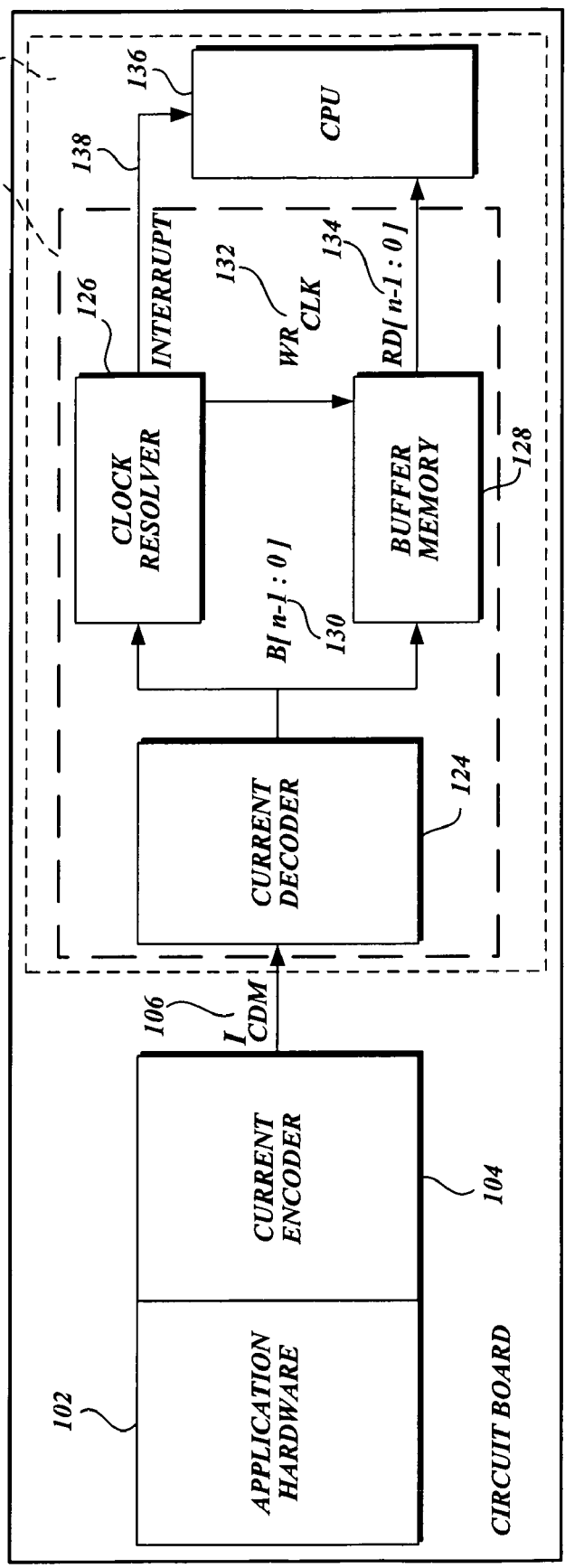
FIG. 1B is a block diagram of an illustrative circuit showing the details of the circuit of FIG. 1A.

FIG. 1B is a more detailed illustrative embodiment of the circuit shown in FIG. 1A. In this illustrative embodiment, the current-to-digital converter 108 shown in FIG. 1A includes a current decoder 124, a clock resolver circuit 126, and a buffer memory 128, collaborating to extract the digital information from the modulated current ICDM 106. The current decoder 124 has the primary purpose of translating or mapping the information encoded in the modulated current ICDM 106 to the N-bit digital format, the details of which are further described below with respect to FIGS. 5, 6, and 8. The clock resolver circuit 126 monitors an unstable digital output data 130 of the current decoder 124 to extract clocking information used to latch the digital output data 130 onto the buffer memory 128 upon stabilization of the digital output 130, as more fully described below with respect to FIG. 7. Once the digital output data 130 are latched in buffer memory 128, the stable digital data 134 is available for use by a target hardware, such as the CPU (Central Processing Unit) 136 as conventional N-bit digital data. In one illustrative embodiment, the clock resolver 126 issues an interrupt signal 138 to signal the CPU 136 that the digital data 134 is stable and may be read. In this environment, digital data from a source hardware 102 is transmitted to a target hardware 136 by current division multiplexing and decoding performed by the current encoder 104 and current decoder, respectively. Thus, in this embodiment, the transmission of digital data from the source to the target requires a single physical conductor carrying the modulated current ICDM 106, instead of N physical conductors. In one illustrative embodiment, the current-to-digital converter is included in a processing module 140 which also contains the CPU 136. For example, multi-chip modules or packages may be used to contain more than one chip bonded together via their respective signal interfaces. In another illustrative embodiment, the current-to-digital converter 108 is integrated on the same die or substrate as the CPU 136. In yet another illustrative embodiment, the current-to-digital converter 108 and the CPU 136 are implemented using discrete components at board level.

Figure 1C:
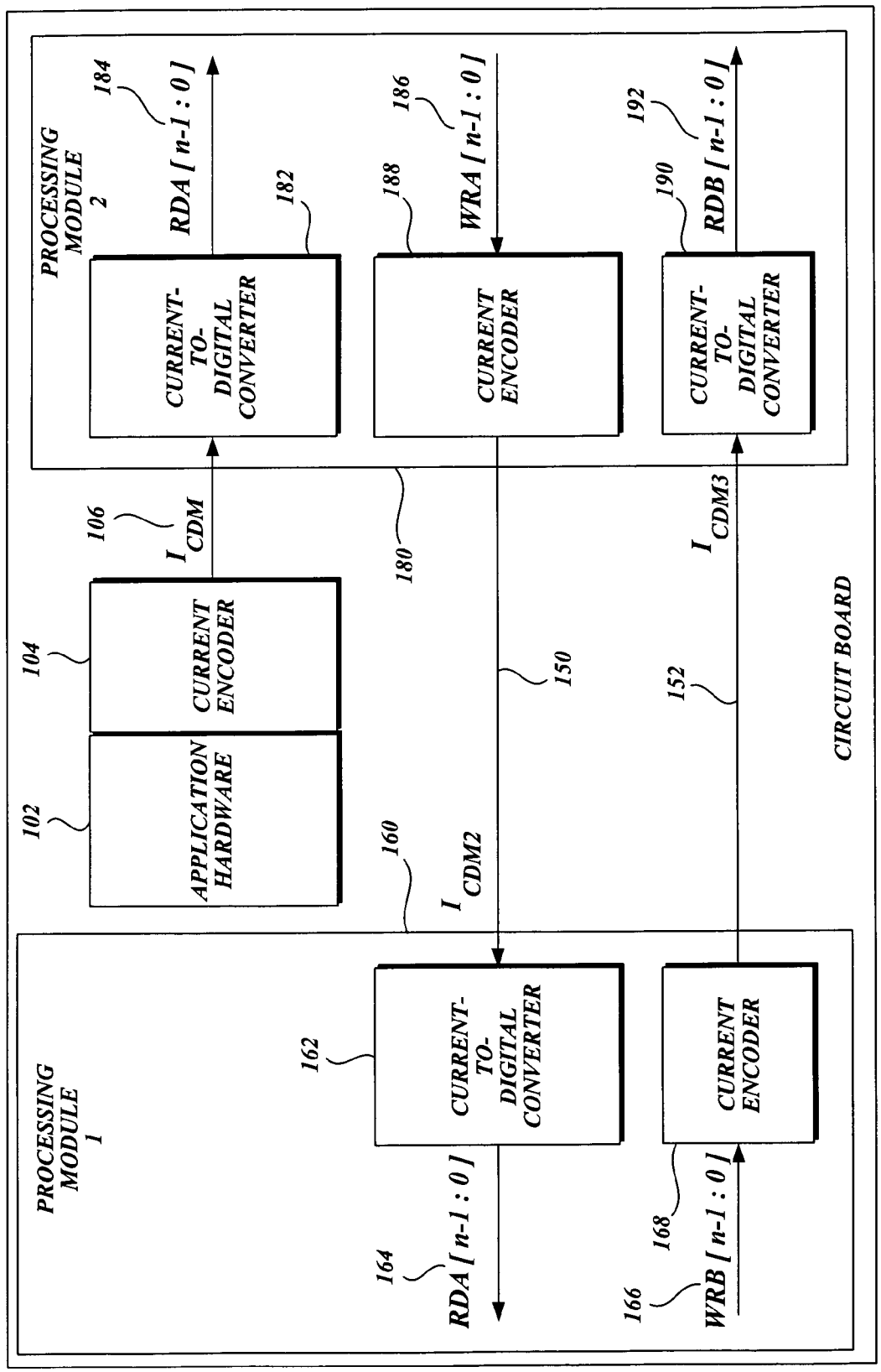
FIG. 1C is a block diagram of an illustrative circuit showing multiple processing modules including the current encoder and current-to-digital converter of FIG. 1B.

The use of the current encoder 104 and the current-to-digital converter 108 is not limited to a single pair of such components. FIG. 1C shows an illustrative circuit board having multiple processing modules including multiple current encoders and the current-to-digital converters. In this illustrative example, a processing module 180 includes two current-to-digital converters 182 and 190 and one current encoder 188. As shown in FIG. 1B, the processing modules 160 and 180 each include a processor 136, not shown in FIG. 1C for clarity. An application hardware module 102 and a current encoder 104 modulate a current ICDM 106 using digital data for transmission to processing module 2 over a single conductor carrying the ICDM 106. The data is subsequently decoded by the current-to-digital converter 182 and converted to multi-bit digital form, as described above with respect to FIG. 1B. Generally, the converted data 184 is processed in conventional digital form by a CPU (not shown in FIG. 1C) included in the processing module 2. Other multi-bit digital data 186, which may be based on the converted data 184, may be used to modulate a current ICDM2 150 via current encoder 188 for transmission to another current-to-digital converter 162 of processing module 1 on a single conductor. The current-to-digital converter 162, in turn converts the current-encoded data 186 back to digital form for use by a CPU (not shown in FIG. 1C) included in the processing module 1. Similarly, the processing module 1 may generate and transmit other multi-bit digital data 166 to the processing module 2. The processing module 1 uses the digital data 166 to modulate a current ICDM 3 via a current encoder 168 for transmission on a single conductor. The current-encoded data is received at processing module 2 by a current-to-digital converter 190 and converts the current-encoded data back to multi-bit digital format data 190 for further processing and/or transmission to other processing modules on the circuit board by the processing module 2. In this illustrative embodiment, the inter-processor communications between the processing modules 1 and 2 are performed using three conductors carrying currents ICDM 106, ICDM2 150, and ICDM3 152, respectively, instead of using three multi-bit busses for data transmission, reducing size, power consumption, heat generation, and RF radiation on the circuit board.

Figure 2:
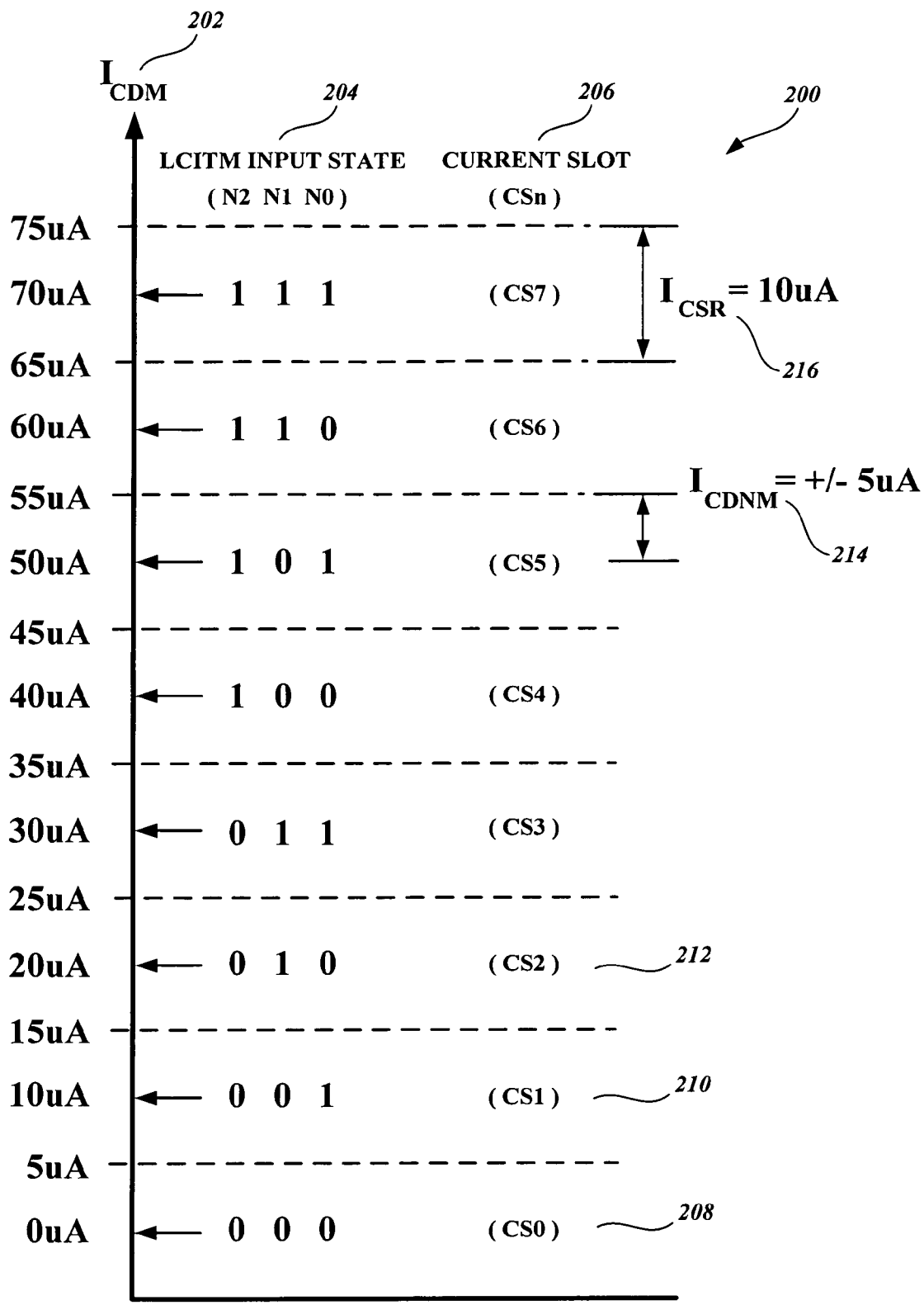
FIG. 2 is a pictorial diagram of an illustrative representation of a current translation matrix for a three-input digital signal interface.

The encoding of the digital data from the source hardware onto the modulated current ICDM 106 is performed according to a predetermined mapping of data bit-patterns to corresponding current levels. FIG. 2 shows an illustrative example of a matrix depicting the mapping of bit combinations or input states to current levels or slots. The logic-current input translation matrix (LCITM) 200 defines the mapping of input states 204 to current slots 206 by associating each N-bit combination with a distinct current slot. Each current slot 206 is defined by a lower and an upper boundary. Each particular value of the N input states 204 is defined as a unique combination of the N bits. In one illustrative embodiment, the current slots 206 are contiguous. That is, the boundary values for each current slot 206 are in numerical order with respect to the boundary values of the current slots before and after each current slot 206. In another illustrative embodiment, the current slots 206 are non-contiguous and their respective boundaries are determined based on other criteria. In the example shown in FIG. 2, N=3, from bit 0 to bit 2. For example, bit combination "0 0 0" is associated with current slot CS0 208, and current bit combination "0 0 1" is associated with current slot CS1 210, etc. The current slot 206 is the value of the modulated current ICDM 106 corresponding to the bit combination represented by the current slot 206. For example, at a particular point in time, a current value of 20 uA (Micro-Ampere) of current slot CS2 212 corresponds to a 3-bit digital data word of "0 1 0". Therefore, the current slot CS2 212 has the same information content as the bit combination "0 1 0" for the purposes of information communication in the system shown in FIG. 1B.

With continued reference to FIG. 2, the ICDM 106 essentially provides a variable current sink controlled by the application hardware 102 that pulls different amounts of current from the current decoder 124, corresponding to different values of current slot 206 and different corresponding bit-combinations, as described above.

With reference to FIG. 1B now, the current encoder 104 must satisfy the following conditions to modulate the current ICDM 106 according to the present disclosures:

1. The current encoder for 104 must draw a fixed and unique amount of current for ICDM 106 from a voltage source of the current decoder 124 (not shown in the figure) for each unique data bit-combination with a variance in the amount of current less than a predetermined Current Decoder Noise Margin ICDNM 214. For example, the ICDNM 214 may be set at ±5 uA for the illustrative example shown in FIG. 2.
2. The minimum ICDM 106 separation between any two unique data bit-combinations of the N bits must be greater than a predetermined Current Slot Resolution ICSR 216 to ensure that all possible input activity profiles are uniquely represented without aliasing. For example, the ICSR 216 is determined to be 10 uA for the illustrative example shown in FIG. 2.

Figure 3:
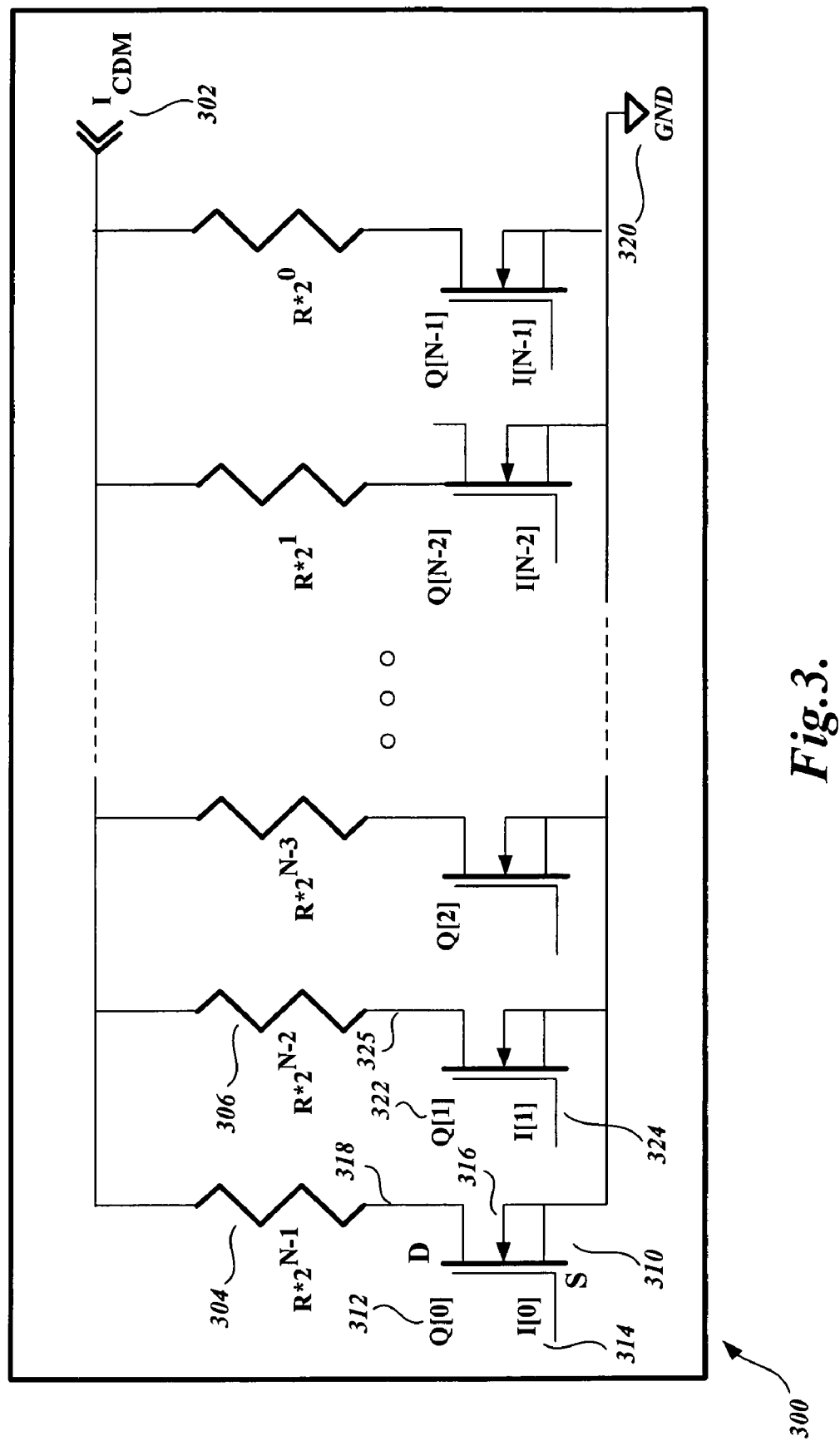
FIG. 3 is a pictorial diagram of an illustrative circuit for implementing the translation matrix of FIG. 2.

Different circuits may be designed that satisfy the above requirements. One illustrative embodiment of the current encoder 104 is depicted in FIG. 3. A circuit 300 includes a current lead 302 coupled with N NMOS transistors 312, 322, etc., each transistor connected to a resistive element 304 at the drain terminal 318 of the transistor 312, and coupled with a ground node 320 at the source terminal 310 of the transistor 312. Those skilled in the art will appreciate that other electronic, mechanical, electromechanical, or optical components and techniques that can provide the functionality of an electronic switch may be used instead of the transistors 312, 322, etc. For example, other transistor types such as bipolar, PMOS, JFET, etc., may be used as appropriate for the application. The substrate 316 may also be connected to the ground node 320 or a voltage source for appropriate substrate biasing. The N transistors 312, 322, etc., correspond to the N data signals to be represented by the modulated current ICDM 106 (shown in FIG. 1B). The base of the transistor 312 is coupled with a corresponding signal bit 314, for example, bit 0, from the N data signals being encoded in the modulated current ICDM 106.

With continued reference to FIG. 3, in operation, the amount of current drawn through the lead 302 is determined by which of the transistor switches 312, 322, etc., are on (i.e., closed and passing current) and what value the respective resistive components have. Each digital bit 314, 324, etc. may turn the transistor 312 on or off as a switch to draw a predetermined amount of current through lead 302 based on the value of the corresponding resistive element 304. In one illustrative embodiment, the resistive elements 304, 306, etc., include one or more resistors with values determined according to a base value R multiplied by powers of $2^{N-i}$ where the exponent 'i' is equal in number to the position of the $[j+1]^{st}$ bit of the multi-bit digital data being used to modulate ICDM 106, with j=0, 1, 2, etc. For example, the resistor 304 has a value of $R*2^{N-1}$, the resistor 306 has a value of $R*2^{N-2}$, etc. Those skilled in the art will appreciate that other resistive elements or other values for the resistive elements may be used without departing from the spirit of the present disclosures.

Thus, the combination of the digital bits 314, 324, etc., that control the switches 312, 322, etc., and the corresponding resistive elements 304, 306, etc., determine how much current is drawn through the lead 302. The circuit 300 is designed such that a particular bit combination formed by the N signal bits 314, 324, etc., causes an amount of current to be drawn from the lead 302 that is equal to the value of current slot 206 corresponding with the particular bit combination represented by the N signal bits 314, 324, etc., as prescribed in the LCITM 200. For example, for N=3, if the bit combination represented by the N signal bits is equal to "0 1 0", then only transistor 322 is turned on and the current drawn from lead 302 is equal to the value of current slot 212, namely, 20 uA. If multiple transistors are turned on by a bit combination, for example, "1 1 0", then the current drawn from the lead 302 is the sum of the currents drawn due to each of the multiple transistors, for example, 312 and 322, corresponding to the appropriate current slot defined in LCITM 200.

Figure 4:
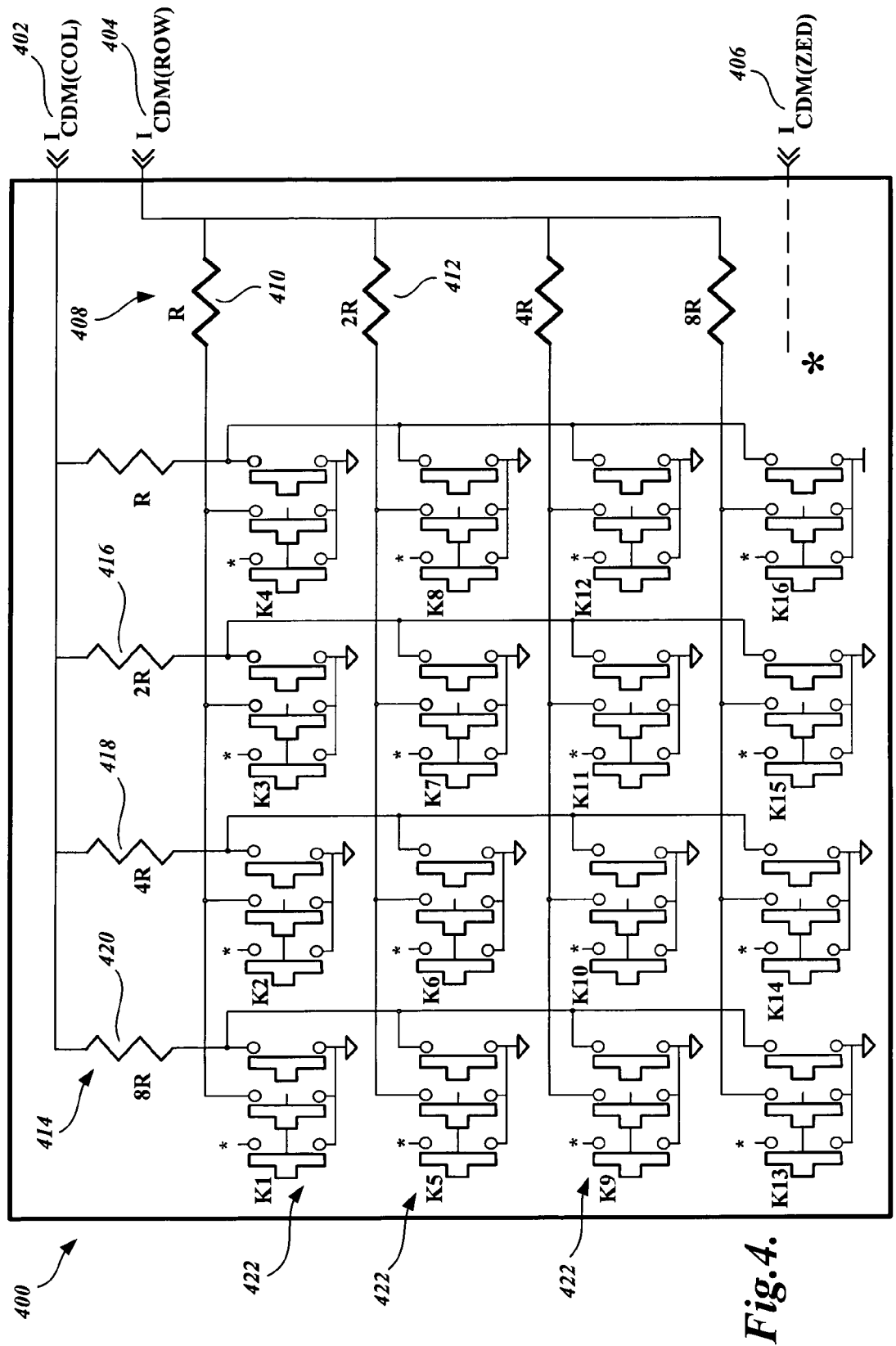
FIG. 4 is a pictorial diagram of an illustrative circuit for implementing a current translation matrix for a keyboard.

The scheme of circuit 300 discussed above with respect to FIG. 3 may be used in different applications. For example, a computer keypad or keyboard may be implemented using a similar technique. FIG. 4 is an illustrative example of a keyboard circuit 400 including a matrix of switches 422 corresponding to a matrix of keys K1-K16. The matrix of switches 422 forms a coordinate system for identifying keys K1-K16. Each switch in the matrix of switches 422 is coupled with a row current line 404 (i.e., lead or conductor) and a column current line 402. The location of the key pressed is determined based on the row and column coordinates of the key within the matrix of switches 422. In a traditional keyboard, one discrete signal or bit is used to represent a particular position for each row and column. The sets of signals corresponding to rows and columns form row and column coordinate buses, respectively. Accordingly, the row and column coordinates are represented by a row and column bit pattern defined by the row and column coordinate buses. In accordance with the present disclosures, the row and column coordinate buses are replaced by a row and a column current line 404 and 402, respectively, and the bit patterns on the row and column coordinate buses are encoded as modulated current signals as discussed above. For example, pressing the key K2 causes each of the row and column current lines 404 and 402, respectively, draw an appropriate amount of current that correspond to the bit pattern representing the row and column coordinates of the key K2.

An advantage of the present disclosures in reducing the size of a circuit can be better appreciated when considering that the traditional discrete switch matrix implementations for keyboards require N rows and M columns of I/O (Input/Output) signal lines to interface to a keyboard scanner, requiring [M+N] signal lines. For example, a typical 108-key keyboard requires 14 rows and 8 columns for a total of 14+8=22 signal lines to interface to the keyboard scanner. Substituting a current line for the row signal lines and another for the column signal lines reduces the number of interface signal lines to three: row current line, column current line, and ground line. Another related advantage is that the number of the current signal lines is independent of the number of keys or number of rows and columns. If the number of keys and thus rows and columns increases, the number of current signal lines does not increase. Only the number of current slots 206 (see FIG. 2) increases to accommodate the added number of rows and columns. A third related advantage is simultaneous scanning of all keys at once instead of the conventional row-at-a-time method, thereby reducing the frequency of software interrupt service routines and associated overheads by N−1/N and increasing system performance. Simultaneous scanning is possible because the modulated row and column currents on row current line 404 and column current line 402, respectively, include all active row and column bits simultaneously as encoded data, instead of bits from one row or column at a time.

The keyboard circuit shown in FIG. 4 also solves a problem known as key-ghosting. Key-ghosting is an inherent problem in traditional key matrix hardware implementations. Key-ghosting is the misreporting of a key state as pressed when it is not. When three keys that form three vertices of a rectangle on the keyboard matrix are pressed, Key-ghosting occurs for a key that is the fourth vertex of the rectangle. For example, keys K1, K5, K7, and K3 form a rectangle on the matrix of switches 422. For a traditional keyboard with row and column coordinate buses, if three keys K1, K5, and K7 are simultaneously pressed, then the key K3 is detected as pressed when K3 is not actually pressed. This happens because of unintended short circuits through the keyboard matrix when multiple keys are simultaneously pressed. To overcome the key-ghosting problem, complex software algorithms are used to mask off ghosted keys inherent in scanner readings for traditional keyboards. The end result is that many 3-key (or more) sequences, used in some software applications or system commands, cannot be detected and supported using traditional keyboards. This problem adds a significant burden in the design of keyboard matrices because meticulous effort in key configuration is required to assure that desired 3-key sequences are not physically located in the keyboard matrix such that the rectangular key configuration problem (i.e., key-ghosting) described above is encountered.

The key-ghosting problem is addressed in the illustrative embodiment shown in FIG. 4 by using one additional current line 406, not fully shown in FIG. 4 for purposes of clarity. Each of the keys K1-K16 includes a single-pole-triple-throw (SPTT) switch to completely isolate the three different current paths described below. Each of the three ungrounded terminals within the SPTT is coupled with one distinct current line: the row current line 404, the column current line 402, and a Zed current line 406. The connections between each SPTT and the row and column current lines are explicitly shown in FIG. 4 while, as noted above, the connections to the Zed current line 406 are depicted by an asterisk ('*') on the appropriate terminal of the SPTT for clarity. In effect, the Zed current line 406 is a third coordinate for each key, that allows differentiation between an intentional short circuit (i.e., activation of switch), when a key is actually pressed, and an unintentional short circuit (i.e., virtual activation of switch) that occurs in the key-ghosting problem.

With continued reference to FIG. 4, mapping of a power-of-2 resistor progression (that is, 2R, 4R, 8R, . . . , or generally, $R*2^N$, where N is the number or rows or columns in the matrix) may be used to achieve the desired functionality. Each switch resistor in the Zed plane may be assigned such that the same resistor resistance value does not appear more than once in any row or column shared by a switch at the intersection of the row and column. In addition, no resistance may appear more than twice in any arbitrary rectangle formed by any four (4) switches in the matrix.

Figure 5:
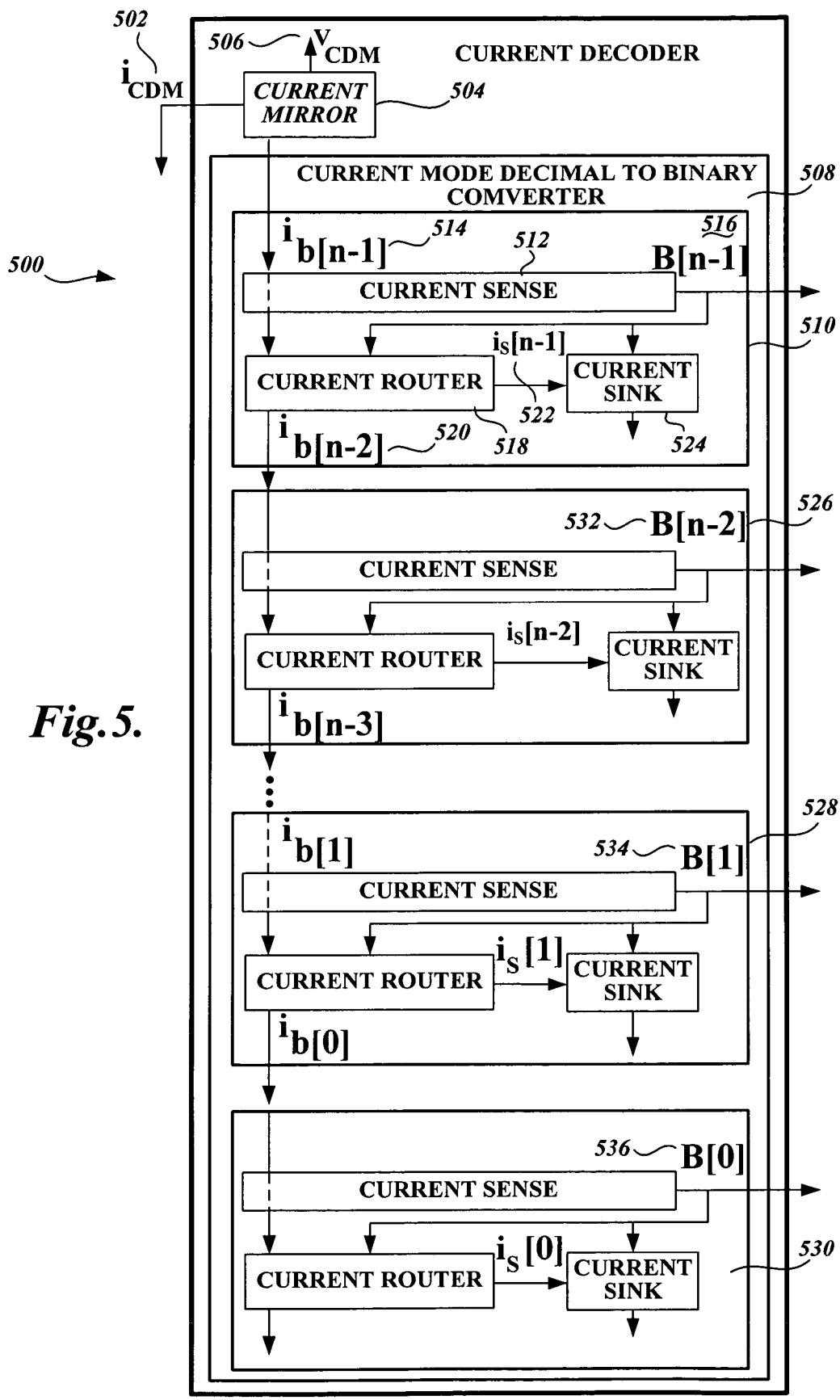
FIG. 5 is a pictorial diagram of an illustrative implementation of the current-to-digital converter shown in FIG. 1A.

As discussed above with respect to FIG. 1B, the current-encoded data transmitted using the modulated current ICDM 106 must be decoded to extract the data and put in digital format for use by the target hardware, such as CPU 136. FIG. 5 shows an illustrative embodiment of a serial current decoder 500 including a current mode decimal to binary converter 508. In this illustrative embodiment, the current mode decimal to binary converter 508 includes a series of N bit stages arranged in a current sense ladder topology that converts the data encoded by a modulated current decoder input 502 to a digital data word including multiple digital data bits. The current decoder input 502 is provided by the ICDM 106. The serial current decoder 500 decodes the most significant bit (MSB) of the digital data word first. Each bit value is extracted from the data encoded on the current decoder input 502 by a different bit stage circuit 510, 526, 528, and 530 arranged in successive order (i.e., serially) from the MSB N−1 516 to less significant bits 532, 534, and finally to the least significant bit (LSB) 0 536. The serial current decoder 500 converts the instantaneous current being sinked by the current decoder input 502 to an N-bit digital value in real-time. In this illustrative embodiment, the current decoder 500 does not interpret signal transitions in current, resolve input synchronization or perform any de-bouncing of the input current. In one illustrative embodiment, the current decoder input 502 is coupled to a current mirror circuit 504 connected to a voltage source 506. The current mirror 504 is used for isolating the current decoder input 502, optional internal current domain biasing, and uniform thermal compensation within the serial current decoder 500 itself. In this manner, any variance in the accuracy or operating point of the current mirror 504 can be compensated for programmatically in software.

The current mirror 504 supplies the identical current signal inputted from the current decoder input 502 to a current mode decimal to binary converter 508, which includes all the bit stages 510, 526, 528, and 530. The MSB bit stage 508 extracts the MSB 516. Each bit stage includes a current sense module, a current router module, and current sink module. Specifically, the MSB bit stage 510 includes a current sense module 512, a current router module 518, and a current sink module 524. The MSB bit stage 510 provides a residual current 520 as input current to the next bit stage 526. Similarly, each bit stage provides its own residual current as input current to the next bit stage until the LSB bit stage 530 is reached and the conversion of current-encoded data to digital format (i.e., binary data) is complete.

Figure 6:
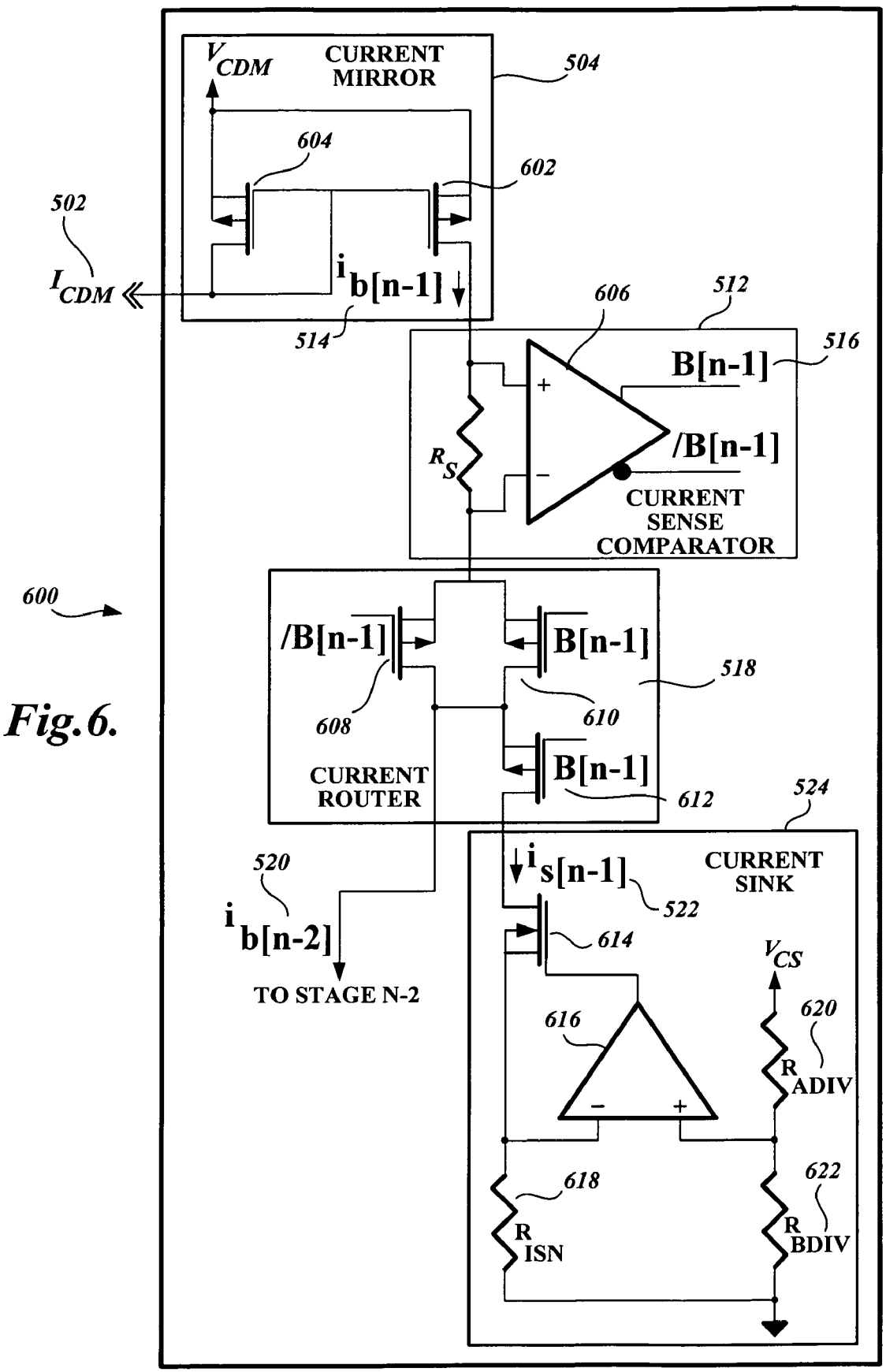
FIG. 6 is a pictorial diagram of an illustrative circuit showing the details of one bit stage of the current-to-digital converter shown in FIG. 5.

The current sense module 512, current router module 518, and current sink module 524 perform the core conversion of current-encoded data to digital format and may be implemented in various ways. FIG. 6 is an illustrative embodiment of the current mirror 504, current router module 518, and current sink module 524. In each bit stage, for example, the MSB bit stage 510 (FIG. 5), the current sense module 512 drives a non-inverting output of a comparator 606 high to assert bit N−1 of the digital data being extracted, if the magnitude of the current mirror output current 514, which is the same as the input modulated current to the present bit stage, exceeds a threshold for asserting the corresponding bit 516. If the magnitude of the current mirror output current 514 is below the threshold for asserting the corresponding bit 516, the inverting output of comparator 606 is activated. Subsequently, the output current 514 flows into the current router 518 and then into the current sink 524, as shown in FIG. 6. In effect, the modulated current, representing the transmitted data passing through the current decoder input 502, cascades down each bit stage and at each bit stage the value of the corresponding digital bit is determined as logic '0' or logic '1'. At the end of this serial process, the whole digital data word is extracted from the modulated current.

In operation, the current sense module 512, current router module 518, and current sink module 524 collaborate to extract the digital data bits during successive phases at each bit stage. At each present bit stage through which the current is presently passing for extraction of digital data, the current sink 524 is enabled, by closing switches 610 and 612, and draws a sink current 522 if the non-inverting output of the comparator 606 is active, indicating a logic '1' at the present bit stage. The sink current 522 is subtracted from the modulated current and the residual or remainder current passes as the input modulated current 520 to the next bit stage. The current sink module 524 includes a switch 614, an operational amplifier 616 and resistors 618, 620, and 622 to control the amount of sink current 522 drawn to a precise amount corresponding to the initial/representative contribution of the present bit to the modulation of the modulated current ICDM 106. Thus, the modulation of the present bit is removed from the input modulated current 514 of the present bit stage to produce the input modulated current 520 for the next bit stage. If the inverting output of the comparator 606 is active, then the value of the present digital bit 516 is logic '0', the switches 610 and 612 remain open, and no sink current 522 is drawn by the current sink module 524. Accordingly, the input modulated current 514 of the present bit stage passes on unchanged as the input modulated current 520 for the next stage.

Those skilled in the art will appreciate that though a serial current decoder has been presented above with minimal power consumption, a parallel implementation of the current decoder could be substituted to trade off power for speed.

Figure 7:
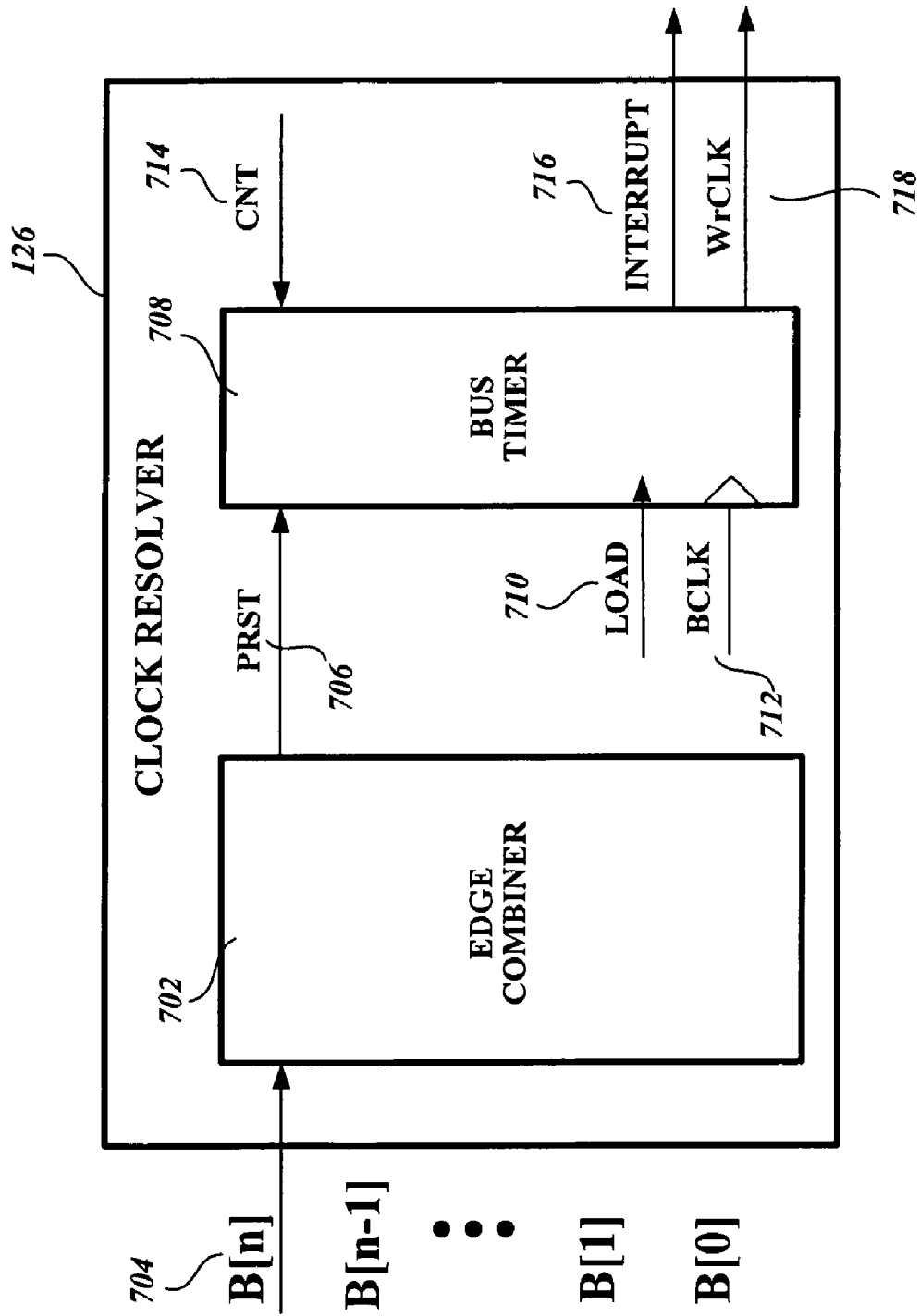
FIG. 7 is a pictorial diagram of an illustrative circuit of the clock resolver shown in FIG. 1B.

When all bit stages complete extracting their corresponding digital data bits from the modulated current ICDM 106 as described above, the extracted digital data bits 516, 526, 528, etc., constituting the digital output data 130 may be unstable in terms of logic levels and timing. The clock resolver 126 is responsible for extracting clocking information from the extracted digital data bits 516, 526, 528, etc., for synchronization, digital data word-latching, and interrupt generation to notify the digital hardware target 112 (see FIGS. 1A and 1B) that the digital data word 110 is ready for reading. FIG. 7 shows an illustrative clock resolver 126. In one illustrative embodiment, the clock resolver 126 includes an edge combiner 702 for processing the input digital data 704, being the same as the digital output data 130 shown in FIG. 1B. The clock resolver 126 further includes a bus timer module 708 to handle timing and notification of the digital hardware target 112. The bus timer module 708 also includes a preset input 706, a load input 710, a base clock input 712, a count input 714, an interrupt signal output 716, and a write clock output 718.

In operation, the clock resolver 126 monitors the unstable digital data word 704 for changes in state and generates the write clock 718 for latching the digital data word 704 onto the buffer memory 128 (see FIG. 1B), as well as for generating the interrupt signal output 716. The buffer memory 128 is typically implemented as a standard N-bit wide dual-port asynchronous FIFO (first-in first-out) memory, but other implementations are possible as known in the art. The edge combiner 702 generates the preset input 706, usually as a pulse, to the bus timer module 708 when a positive or negative edge is detected on any of the bit signals from the input digital data 704. This preset pulse 706 re-loads the bus timer module 708 with a programmable count via count input 714, where the value of the count is based on the timing characteristics of the input digital data 704. The bus timer 708 is a free-running watchdog style down-counter that counts down to zero from its pre-loaded count value. When the bus timer 708 counts down zero, it generates the write clock 718 (WrClk) used to clock the instantaneous states of the bits included in the input digital data 704 into the buffer memory 128. It also generates the interrupt signal 716 to notify the digital hardware target 112 that a new digital data word has been received and is ready to be read as stable digital data 134 from the buffer memory 128. In the illustrative embodiment shown in FIGS. 5 and 6, the serial current decoder 500 includes some propagation delay through the bit stages N−1 to 0. The propagation delay is smaller for the more significant bits that are processed before the less significant bits. As such, output digital data bits 516, 532, 534, and 536 have increasing delays, each with respect to the previous data bit. With reference to FIGS. 1B and 5, as the modulation on the current decoder input 502 changes with new digital data words, originating from the application hardware 102 end, being current-encoded for transmission, the timing of the output digital data bits 516, 532, 534, and 536 also change. As such, the edge combiner 702 synchronizes the output digital data bits 516, 532, 534, and 536 with each other, based on the timing of their respective signal edges, to form a stable output digital data word for latching onto the buffer memory 128.

In another illustrative embodiment, a parallel current decoder does not create bit stage propagation delays as does the serial current decoder 500, but as in any digital circuit, there will be gate propagation delays and the edge combiner 702 is still required to synchronize the output digital data bits to form a stable digital data word.

The bus timer 708 is loaded with a count value through the count input 714 that, when combined with the base clock 712, generates a timeout period that is greater than the maximum propagation delay in the serial current decoder 500. That is, count value, and thus, the timeout period is set such that all output digital data bits 516, 532, 534, and 536 are given sufficient time to stabilize and take on their correct digital values before the digital data word 130 is latch into the buffer memory 128. The programmable bus timer 708 provides a programmatic mechanism to adjust the timeout period for delays due to temperature and characteristic impedance changes in circuit in real-time.

Because of the self-clocking nature of the clock resolver 126 with respect to synchronizing the output digital data bits 516, 532, 534, and 536, the rate of data transmission from source end application hardware 102 to the target end digital hardware target 112 can be variable and constrained only by a maximum rate of transmission determined by the response time of the serial current decoder 500 and the clock resolver 126. As long as the data transmission rate is below such maximum rate, any data transmission rate can be used without requiring adjustment of clock rates, handshaking protocols, or other bus timing initializations. The application hardware 102 may generate the digital data words synchronously or asynchronously and transmit them at any rate below the maximum rate in real time. Though not explicitly shown in FIG. 7, the base clock 712 can be gated to be disabled during periods of data transmission inactivity to save additional power.

Figure 8:
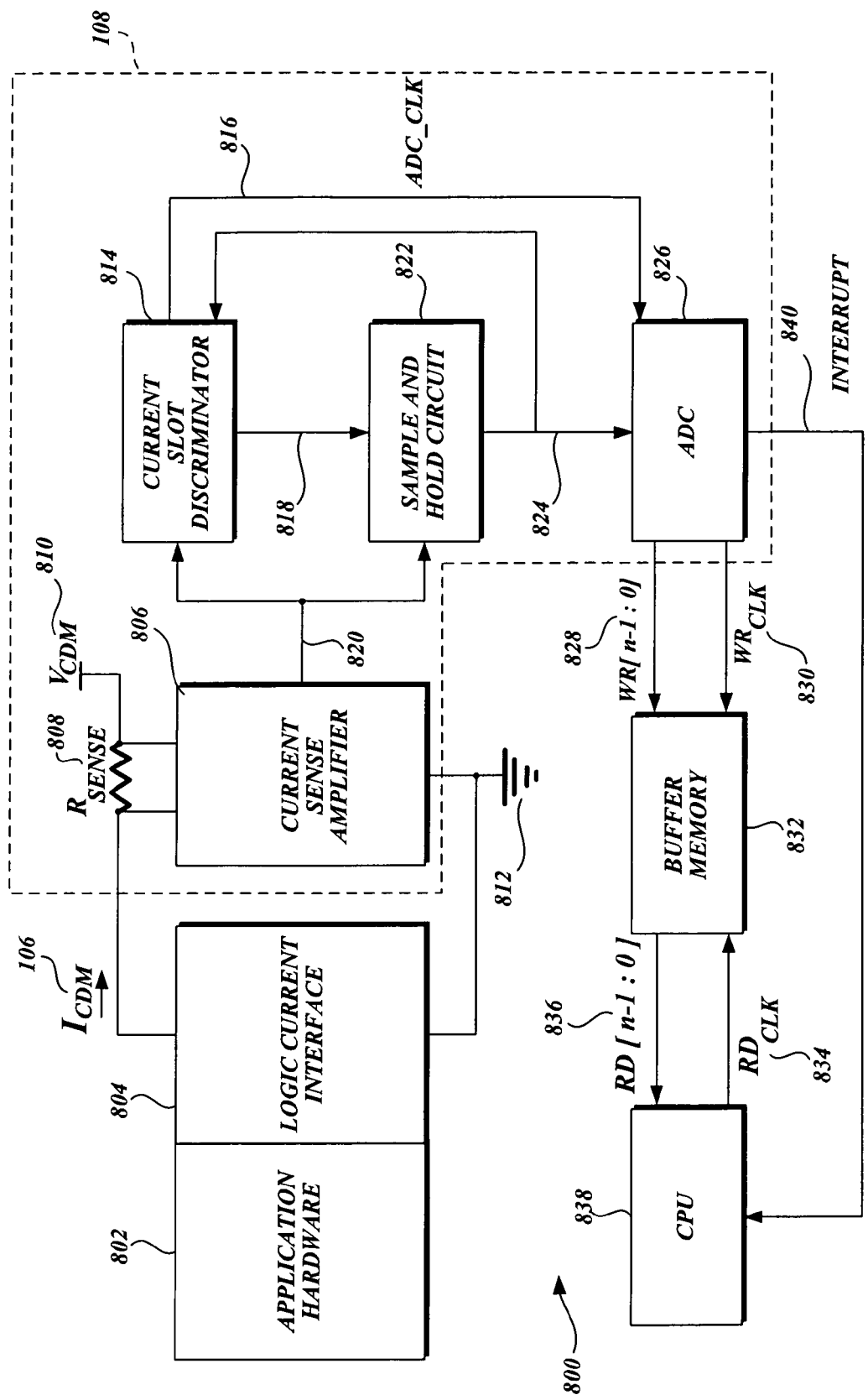
FIG. 8 is a block diagram of an illustrative circuit for converting multiple digital signals to a multiplexed current mode signal using a current sense amplifier.

Another method of signal conversion in the signal conversion stage discussed above includes using a current sense amplifier (CSA) instead of the current decoder 500. FIG. 8 shows an illustrative embodiment of a current-mode data encoding circuit 800 using a current sense amplifier. The data encoding circuit 800 is similar to the data encoding circuit shown in FIGS. 1A and 1B, but with a different signal conversion stage based on a method using a CSA 806. As such, only the differences between the embodiments shown in FIG. 1B and FIG. 8 are described below. The data encoding circuit 800 includes an application hardware module 802 that generally generates digital data words for encoding via a current encoder 804. The current encoder 804 is similar to the current encoder 104 described above. The circuit modules that are different from the embodiment shown in FIG. 1B include the CSA 806, a current slot discriminator (CSD) 814, a sample and hold circuit (S&H) 822, and an analog to digital converter (ADC) module 826. The aforementioned circuit modules constitute another illustrative embodiment of the current-to-digital converter 108, as shown within the dotted lines in FIG. 8.

With continued reference to FIG. 8, like the current decoder 124 (FIG. 1B), the CSA 806 monitors the modulated ICDM 106 through a sense element 808, such as a resistor connected to a voltage source 810, as shown in FIG. 8. A buffered voltage output 820 of the CSA 806 is input into the CSD 814 and the S&H 822. The CSD 814 is coupled to the S&H 822 via an S&H control output line 818. The CSD 814 also outputs an ADC clock signal 816, which is input into the ADC module 826. The S&H 822 outputs a hold signal 824, which is fed back to the CSD 814. The ADC module 826 outputs a digital data word 828 and a write clock signal 830 to the buffer memory 832. The buffer memory 832 provides a stable digital data word 836 and a read clock 834 to the digital hardware target, such as the CPU 838.

The CSA 806 senses instantaneous ICDM 106 through the sense element 808 and in real-time converts this current to the buffered voltage output 820 that is proportional to the ICDM 106. In essence, the buffered voltage output 820 is equivalent to the ICDM 106. The CSA 806 does not monitor or process signal transitions in the modulated instantaneous current ICDM 106, synchronize digital bits, or perform any de-bouncing of the ICDM 106. The CSA 806 senses the instantaneous ICDM 106 through the sense element 808, mirrors the ICDM 106 current, for example, as described above with respect to FIG. 6, and converts the ICDM 106 to the buffered voltage output 820 that is independent of the load presented by the ICDM 106 to the voltage source 810. Those skilled in the art will appreciate that other methods of implementing a current sense circuit, such as low-side, flying capacitor, over-the-top, etc. configurations may be used, depending on application constraints, without departing from the spirit of the present disclosures.

The CSA 806 module is subject to several constraints. For example, the electrical current consumption of the CSA 806 must not contribute to the buffered voltage output 820 presented to the CSD 814 and S&H 822 to avoid altering the relationship between the buffered voltage output 820 and the ICDM 106 from which the buffered voltage output 820 is derived. Additionally, the buffered voltage output 820 must be less than a predetermined CSD 814 activation voltage $V_{CSDACT}$ to the CSD 814 when the ICDM 106 is less than a predetermined CSD 814 activation current $I_{CSDACT}$. This way, when ICDM 106 is not active, the CSA buffered voltage output 820 is below the $V_{CSDACT}$ and CSD 814 is not activated, thus, further saving power. Furthermore, a transfer function of the CSA 806, $V_{CSA}/I_{CSA}$, must be linear, that is, the buffered voltage output 820 across the CSA 806 module ($V_{CSA}$) must be directly proportional to the current drawn through CSA 806, ICDM 106 ($=I_{CSA}$). CSA 806 implementations that meet the above constraints can perform the corresponding functions, further described below.

The CSA 806 works in collaboration with the CSD 814, the S&H 822, and the ADC 826 modules to extract the digital data word encoded on the ICDM 106. The CSD 814 monitors the buffered voltage output 820 from the CSA 806 for current slot 206 (see FIG. 2) transitions and generates the clocks and timing controls needed by the S&H 822 and ADC 826 modules.

In one illustrative embodiment, the CSD 814 includes a sliding window voltage comparator and a bus timer (these are internal components of the CSD 814 and neither is shown in FIG. 8). The CSD 814 bus timer is similar to the bus timer 708 included in the clock resolver 126 (FIG. 7). Those skilled in the art will recognize that the sliding window voltage comparator is essentially a voltage comparator circuit that compares two input voltages, for example, a first input voltage and a second input voltage, and the output of the comparator becomes active (e.g., goes logic '1') when the two input voltages are different by more than a predetermined amount. The predetermined amount is the width of a voltage window defined by the two input voltages, which are some voltage-distance apart. The voltage window becomes a sliding voltage window as the values of the two input voltages vary, thus, creating a voltage window with the same width but different edges/endpoints. Other implementations of a sliding window voltage comparator are possible. For example, two voltage comparators may be used in parallel, each voltage comparator comparing one edge/endpoint of the voltage window with a third input voltage to ascertain whether the third input voltage falls within the voltage window, that is, whether: [first input voltage>third input voltage>second input voltage].

With continued reference to FIG. 8, the sliding window voltage comparator triggers the S&H 822 to latch the instantaneous buffered voltage output ($V_{CSA}$) 820 whenever the buffered voltage output 820 differs from the voltage presently held by the S&H module 822 by more than a voltage corresponding the voltage-equivalent current ICSR 216 (see FIG. 2). In essence, the S&H 822 holds and represents a previous state/value of $V_{CSA}$ 820 and the instantaneous $V_{CSA}$ 820 represents a next state/value. The sliding window voltage comparator monitors the buffered voltage output 820 for negative and positive transitions and continues to trigger the S&H module 822 to acquire and hold (i.e., sample and hold) the present value of the buffered voltage output 820 so long as the current slots 206 are being traversed. In parallel, the sliding window voltage comparator generates a preset pulse (similar to the preset signal 706) to the CSD bus timer when the buffered voltage output 820 transitions to a new value equivalent to a new current slot 206. As described above with respect to bus timer 708 shown in FIG. 7, the preset pulse re-loads the CSD bus timer with a programmable count based on the timing characteristics of the bus. The CSD bus timer is a free-running watchdog style counter that counts down to zero from its pre-loaded count value. When the CSD bus timer reaches zero, the CSD bus timer generates the ADC clock 816 (ADC_CLK) to trigger the ADC module 826 to convert the present S&H state to a digital bit value. So long as current slots 206 are being traversed, the sliding window voltage comparator will continue to preset the CSD bus timer, preventing the CSD bus timer from latching the buffered voltage output 820 until the buffered voltage output 820 has stabilized.

With continued reference to FIG. 8, in one illustrative embodiment, the S&H module 822 performs switched capacitive latching of the buffered voltage output 820 whenever a trigger signal is received via the control output line 818 of the CSD 814. The S&H 822 requires very low current leakage, feed-through, and appropriate droop specifications to achieve and hold a high-resolution value of the buffered voltage output 820. The precision and stability of the buffered voltage output 820 value held by the S&H 822 is critical to correct and accurate current slot 206 identification by the CSD 814 as well as accurate ADC 826 conversion of the voltage held by the S&H 822 to a digital bit in the output of the ADC 826.

With continued reference to FIG. 8, in one illustrative embodiment, the ADC module 826 is an N-bit asynchronous analog-to-digital converter. As noted above, the ADC 826 the SAH output voltage converts the buffered voltage output 820 value held by the S&H 822 to a digital bit output whenever a trigger is received via the control output line 818 of the CSD 814. The resolution requirement of the ADC 826 is dependent upon the number of digital bits initially encoded onto the ICDM 106 by the current encoder 104 (see FIG. 1B), which is directly related to the performance characteristics of the system. The resolution requirement of the ADC 826 is, therefore, deployment- and application-dependent. Typically, a 10-bit ADC 826 is deemed to have sufficient resolution for current-encoding an 8-bit digital word, and a 16-bit ADC 826 is deemed to have sufficient resolution for current-encoding a 12-bit digital word.

With continued reference to FIG. 8, in operation, in one illustrative embodiment, the CSD 814 monitors the buffered voltage output 820 of the CSA 806. Every time the ICDM 106 changes, the buffered voltage output 820 changes linearly proportionally with respect to the ICDM 106 with a finite propagation delay through the CSA 806. The CSD bus timer is loaded with a count value that, when combined with a base clock rate (similar to the base clock 712 of bus timer 708), generates a timeout period that is greater than the maximum propagation delay through the CSA 806. That is, the timeout period is set such that the CSA 806 has adequate time to settle and converge on the new buffered voltage output 820 value before the CSD 814 issuing the ADC clock signal 816 to convert the buffered voltage output 820 value to a digital bit. This timeout period includes sufficient time for the S&H module 822 to charge up to the new buffered voltage output 820 value. The programmable CSD bus timer provides a programmatic mechanism to adjust the timeout period for delays due to temperature and characteristic impedance changes in circuit in real-time. The CSD 814 generates the appropriate clocking signals (ADC_CLK 816) to convert the stable buffered voltage output 820 value presently held by the S&H 822 to a digital bit using the ADC 826. Upon completion of a conversion, the ADC 826 loads the digital bit included in the digital word 828 into the buffer memory 832 using the write clock 830, and signals the CPU 838, for example, by sending an interrupt signal that a new digital word has been received. The digital word is then retrieved from the buffer memory 832, for example, by a hardware DMA or by the CPU 838.

The maximum rate of end-to-end data transmission using the ICDM 106 is limited by the combined conversion speed of the CSA 806, the S&H 822, and the ADC 826 sample rate. As also noted above, the rate of data transmission from source end application hardware 102 to the target end digital hardware target 112 can be variable and constrained only as noted above. As long as the data transmission rate is below such maximum rate, any data transmission rate can be used without requiring adjustment of clock rates, handshaking protocols, or other bus timing initializations. The application hardware 102 may generate the digital data words synchronously or asynchronously and transmit them at any rate below the maximum rate in real time.

Figure 9:
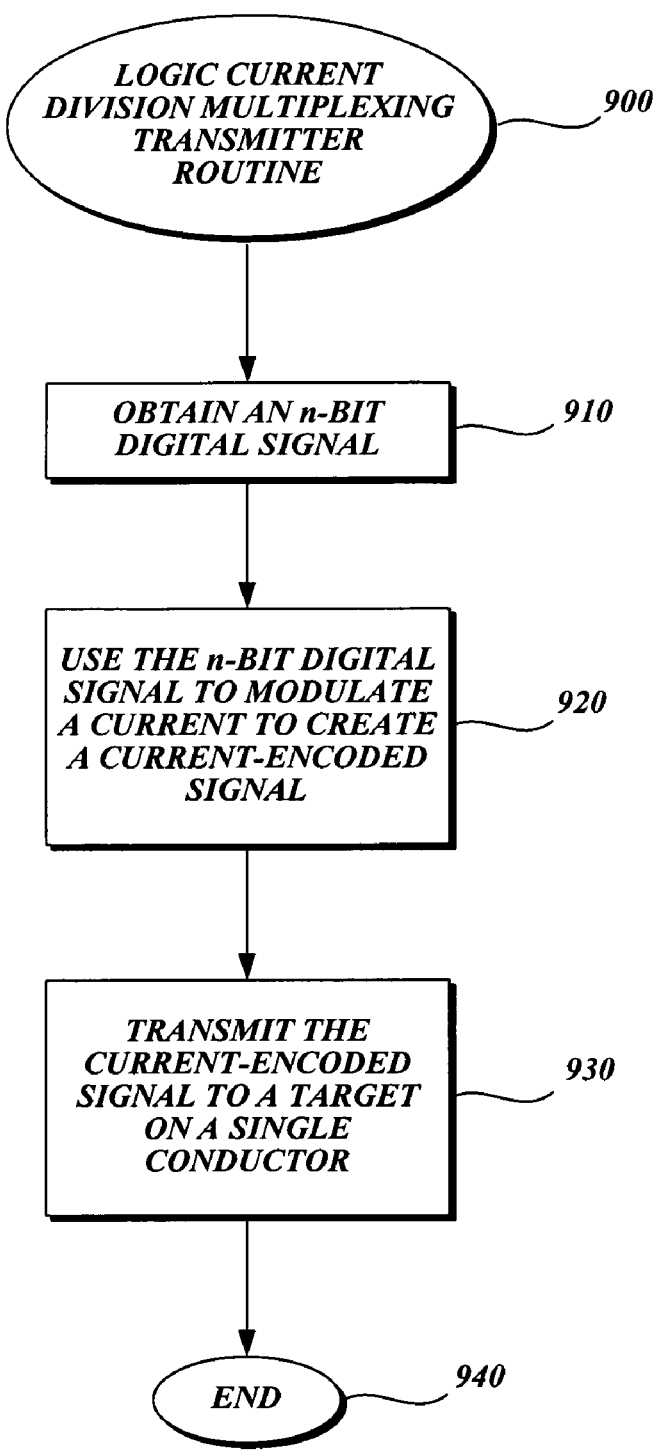
FIG. 9 is a flow diagram of an illustrative method for transmitting multiple digital signals on a single physical conductor.

The method of current-encoded data transmission from the source end, application hardware 102, described above, is outlined in FIG. 9. With reference to FIGS. 1A, 1B, and 9, the logic current division multiplexing transmitter routine 900 proceeds to block 910 where an N-bit digital data word is obtained from the application hardware 102 via current encoder 104. Those skilled in the art recognize that the N-bit digital data word is represented as discrete digital voltages in binary format, for example, TTL (Transistor—Transistor Logic) voltages of 0.8 volts for logic '0' and 2.4 volts for logic '1'. At block 920, these discrete digital voltage levels are used to modulate a current, ICDM 106, and encode the data onto the current for transmission on a single conductor, as described in more detail with respect to FIGS. 2 and 3 above. This way, the N-bits of digital voltage-based data are carried as a current-encoded signal on a single physical line, thus, reducing the number of pins on an IC package containing the circuit 100 from N to 1. At block 930 the ICDM 106 carrying the data as a current-encoded signal is transmitted on a single conductor to the current-to-digital converter 108 for further transmission to the digital hardware target 112. The routine terminates at block 940.

Figure 10:
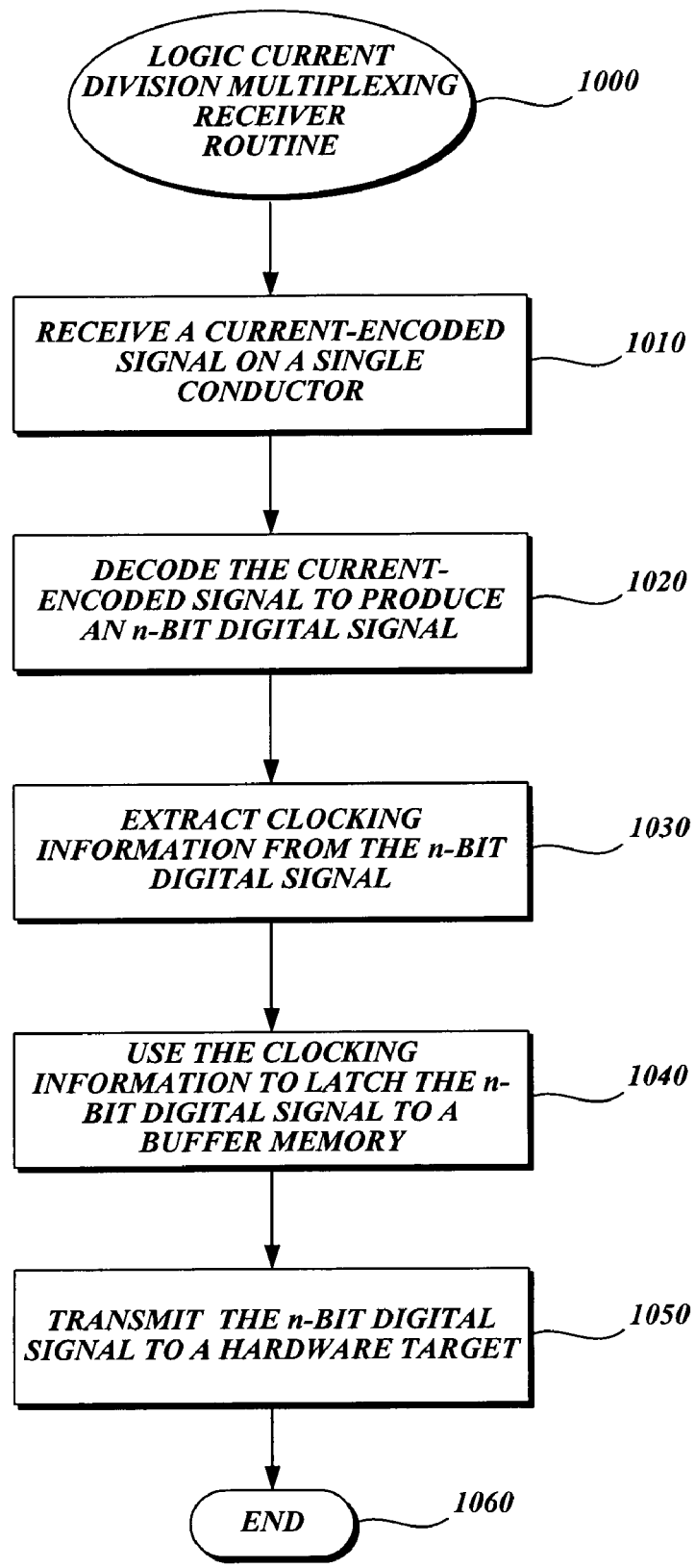
FIG. 10 is a flow diagram of an illustrative method for receiving multiple digital signals from a single physical conductor.

As described above, the current-to-digital converter 108 may be implemented using a current decoder 124, a current sense amplifier 806, or other suitable methods known in the art. FIG. 10 is an illustrative method of receiving a current-encoded signal and converting the current-encoded signal back to an N-bit digital format. The current-to-digital converter 108 converts current-encoded signal carried on ICDM 106 back to N-bit digital format and sends the digital data to the digital hardware target 112. The logic current division multiplexing receiver routine starts at block 1000 and proceeds to block 1010 where a current-encoded signal is received on a single conductor. The current-encoded signal is carried on the modulated ICDM 106 and transmitted from the current encoder 104 to the current-to-digital converter 108. At block 1020, the current-to-digital converter 108 decodes the current-encoded signal to extract the N-bit digital data originally used to modulate the ICDM 106. The decoding process was described in detail above with respect to FIGS. 5-8. In essence, the current-encoded signal carried on the modulated ICDM 106 is converted back to the N-bit digital format originally used to modulate the ICDM 106. At block 1030, clocking information is extracted from the output of the current decoder 124 or CSA 806 as digital output data 130, or buffered voltage output 820, respectively, and used to detect and latch stable digital data onto the buffer memory 128 or 832, respectively, at block 1040. At block 1050, the converted N-bit digital data is read from the buffer memory 128 or 832 by the digital hardware target 112. As noted above, the digital hardware target 112 may be a CPU 136 notified of data availability by an interrupt signal 138. Those skilled in the art will appreciate that other methods, such as polling or DMA, may be used to detect availability of new data for reading.

While illustrative embodiments have been illustrated and described, it will be appreciated that various changes can be made therein without departing from the spirit and scope of the invention.

The invention claimed is:

1. A circuit for encoding an N-bit digital signal onto an electrical current, the circuit comprising:
   N switching components, each switching component including a first switching terminal, a second switching terminal, and a third switching terminal;
   N current limiting components, each current limiting component having a first terminal and a second terminal, the first terminal of each current limiting component being coupled to the first switching terminal of each of the corresponding N switching components;
   a common switching terminal coupled to the third switching terminal of all N switching components;
   an N-bit digital signal source, wherein each of the N bits is coupled with the second switching terminal of each of the corresponding N switching components; and
   an electrical current conductor coupled with the second terminal of all N current limiting components, wherein the N current limiting components are related to each other by a predetermined relationship, and wherein the N current limiting components are configured to allow, based on the predetermined relationship, a current flowing in the electrical current conductor to represent a value represented by the N-bit digital signal.

2. The circuit of claim 1, wherein the N switching components comprise N transistors.

3. The circuit of claim 1, wherein the second switching terminal of each of the corresponding N switching components comprises a base of each of the N transistors.

4. The circuit of claim 1, wherein the N switching components comprise N electromechanical switches.

5. The circuit of claim 1, wherein the N current limiting components comprise N resistors.

6. The circuit of claim 5, wherein an i-th resistor of the N resistors has a value equal to a base value multiplied by [N-(i+1)]th power of 2, with i taking values between 0 (zero) and N-1.

7. A circuit for decoding a current-encoded signal representing a digital word, the circuit comprising:
   an input for receiving a current-encoded signal; and
   a plurality of current-to-digital converter bit stages arranged in a configuration from a most significant bit (MSB) position to a least significant bit (LSB) position, each bit stage operably coupled with a next bit stage, and each bit stage including:
      a current sense module for sensing a current level of a current-encoded signal;
      a current sink module for dividing the current-encoded signal into a sinking portion and a residual portion;
      a current router module for routing the residual portion of the current-encoded signal to the next bit stage; and
      a binary output representing one bit of the digital word represented by the current-encoded signal.

8. The circuit of claim 7, further comprising a current mirror for mirroring the current-encoded signal.

9. The circuit of claim 7, wherein the plurality of current-to-digital converter bit stages are arranged in a serial configuration.

10. The circuit of claim 7, wherein the plurality of current-to-digital converter bit stages is arranged in a parallel configuration.

11. The circuit of claim 7, wherein the current sense module comprises a current comparator.

12. The circuit of claim 7, wherein the current sink module sinks the sinking portion of the current-encoded signal if the current sense module senses that the current level of the current-encoded signal is greater than a predetermined threshold.

13. The circuit of claim 7, wherein all the binary outputs of the plurality of current-to-digital converter bit stages collectively constitute the digital word.

14. A method for encoding an N-bit binary word onto a current, the method comprising:
   associating one of a plurality of unique current ranges with each of the $2^N$ (2 to the power of N) unique combinations of the N bits of the N-bit binary word, wherein the unique current range is determined only based on a predetermined current associated with each of the N bits, and wherein the plurality of the unique current ranges are configurable to be non-contiguous; and
   using each of the N bits of the N-bit binary word simultaneously to modulate a current, wherein the value of the modulated current is determined based on the unique current range associated with a unique combination of the N bits representing a binary value of the N-bit binary word.

15. The method of claim 14, wherein all unique current ranges associated with the $2^N$ unique combinations of the N bits of the N-bit binary word are numerically contiguous.

16. The method of claim 14, wherein each of the N bits causes a predetermined amount of current to be added to the modulated current.

17. The method of claim 16, wherein one of the N bits causes a predetermined amount of current to be added to the modulated current if a binary value of the one of the N bits is binary '1'.

18. The method of claim 14, wherein the modulated current comprises a sum of a plurality of currents.

19. A method for decoding a current-encoded signal representing an N-bit binary word to produce the N-bit binary word in digital form, the method comprising:
   (a) in response to receiving a current-encoded signal, routing the current-encoded signal to a current comparator in one bit stage of N consecutive bit stages, wherein each bit stage of N consecutive bit stages corresponds to only one bit of the N-bit binary word;
   (b) comparing a value of the current-encoded signal to a current value of the one bit stage, and if the value of the current-encoded signal is greater than the current value of the one bit stage, outputting a binary value of '1' corresponding to the one bit stage and reducing the value of the current-encoded signal to produce a residual value of the current-encoded signal; and
   (c) routing the residual value of the current-encoded signal to a next bit stage and repeating steps (a) to (c) above for each consecutive bit stage until all N consecutive bit stages are exhausted.

20. The method of claim 19, further comprising mirroring the current-encoded signal.

21. The method of claim 19, wherein reducing the value of the current-encoded signal by an amount equal to the current value of the one bit stage comprises reducing the value of the current-encoded signal using a current sink circuit to sink a portion of the current-encoded circuit by an amount equal to the current value of the one bit stage.

22. The method of claim 19, wherein routing the residual value of the current-encoded signal to a next bit stage comprises using the outputted binary value of '1' to close a switch.

23. A method for transmitting a digital signal, the method comprising:
using an N-bit digital signal representing a binary value to modulate an electrical current, wherein the N-bit digital signal comprises N discrete voltages, each voltage representing a binary 0 (zero) or 1 (one);
using each of the N discrete voltages to close N discrete switches to conduct a corresponding electrical current, if the value of the corresponding discrete voltage is the binary value of 1, wherein each corresponding electrical current is obtained using a corresponding current limiting component configured to allow the electrical current to represent the binary value;
summing the corresponding electrical currents conducted through the N discrete switches that are closed to form a current-encoded data signal in a single physical conductor, wherein the N discrete switches map values of the N-bit digital signal to corresponding current-encoded data signal values that are configurable to be non-contiguous;
transmitting the current-encoded data signal through the single physical conductor to a current decoder; and
decoding the current-encoded data signal to extract the N-bit digital signal.

24. The method of claim 23, wherein summing the corresponding electrical currents comprises using a single physical conductor connected to the N discrete switches to carry all electrical currents through the N discrete switches.

25. The method of claim 23, wherein decoding the current-encoded data signal comprises:
using a current sense amplifier to convert the current-encoded signal to an output voltage;
using a sliding window voltage comparator and a sample and hold circuit to capture the output voltage; and
using an analog-to-digital converter (ADC) to convert the captured output voltage to the N-bit digital signal.

26. A method for reducing a number of physical interface pins in an integrated circuit (IC) chip package, the method comprising:
(a) configuring a current-decoding circuit to, in response to receiving a current-encoded signal, representing an N-bit binary word, on a single physical pin, route the current-encoded signal to a current comparator in one bit stage of N consecutive bit stages, wherein each bit stage of N consecutive bit stages corresponds to only one bit of the N-bit binary word;
(b) further configuring the current-decoding circuit to compare a value of the current-encoded signal to a current value of the one bit stage, and if the value of the current-encoded signal is greater than the current value of the one bit stage, output a binary value of '1' corresponding to the one bit stage and reducing the value of the current-encoded signal to produce a residual value of the current-encoded signal; and
(c) further configuring the current-decoding circuit to route the residual value of the current-encoded signal to a next bit stage and repeat steps (a) to (c) above for each consecutive bit stage until all N consecutive bit stages are exhausted; and
(d) reducing the number of physical interface pins in the IC chip package by N−1.

27. The method of claim 26, further comprising:
configuring a current-encoding circuit to use an N-bit digital data word representing a binary quantity to modulate an electrical current, wherein each bit of the N-bit digital data word corresponds with one of N corresponding physical interface pin of the IC chip package, each bit representing a binary value of 0 (zero) or 1 (one);
further configuring the current-encoding circuit to use each of the N bits to close N discrete switches to conduct a corresponding electrical current, if the value of the corresponding discrete voltage is the binary value of 1, wherein each corresponding electrical current is obtained using a corresponding current limiting component configured to allow the electrical current to represent the binary quantity;
further configuring the current-encoding circuit to sum the corresponding electrical currents conducted through the N discrete switches that are closed to form a current-encoded data signal in a single physical conductor; and
reducing the number of N corresponding physical interface pins of the IC chip package by N−1.

28. The method of claim 26, wherein the single physical pin is a General Purpose Input (GPI).

29. The method of claim 26, wherein the single physical pin is an Interrupt Request Input (IRQ).

30. The method of claim 26, wherein the single physical pin is a User Interface Matrix Input (UIM).

31. The method of claim 26, wherein the single physical pin replaces a parallel digital data bus.

32. The method of claim 26, wherein configuring the current-decoding circuit comprises embedding the current-decoding circuit in a second integrated circuit chip.

33. The circuit of claim 1, wherein the N switching components comprise N electro-optical switches.

34. The circuit of claim 4, wherein the N electromechanical switches are single-pole, double-throw switches, providing 2 mutually exclusive current encoding paths for the isolation of row and column coordinates in a keyboard switch matrix, wherein a state of the entire keyboard switch matrix is allowed to be scanned by a single sample of a row and a column of the keyboard switch matrix.

35. The circuit of claim 4, wherein the N electromechanical switches are single-pole, triple throw switches, providing three (3) mutually exclusive current encoding paths for isolation of row, column, and zed coordinates in a ghost-free keyboard switch matrix.

36. The circuit of claim 35, wherein a resistance value of a zed-dimension resistor does not appear in any row or column shared by the same one of the N electromechanical switches, and wherein no resistance appears more than twice in an arbitrary rectangle formed by any four (4) of the N electromechanical switches.

37. The method of claim 23, wherein a SYNC signal is superimposed on the transmitted current-encoded data signal to support data clock reconstruction.

* * * * *